Patented Jan. 18, 1949

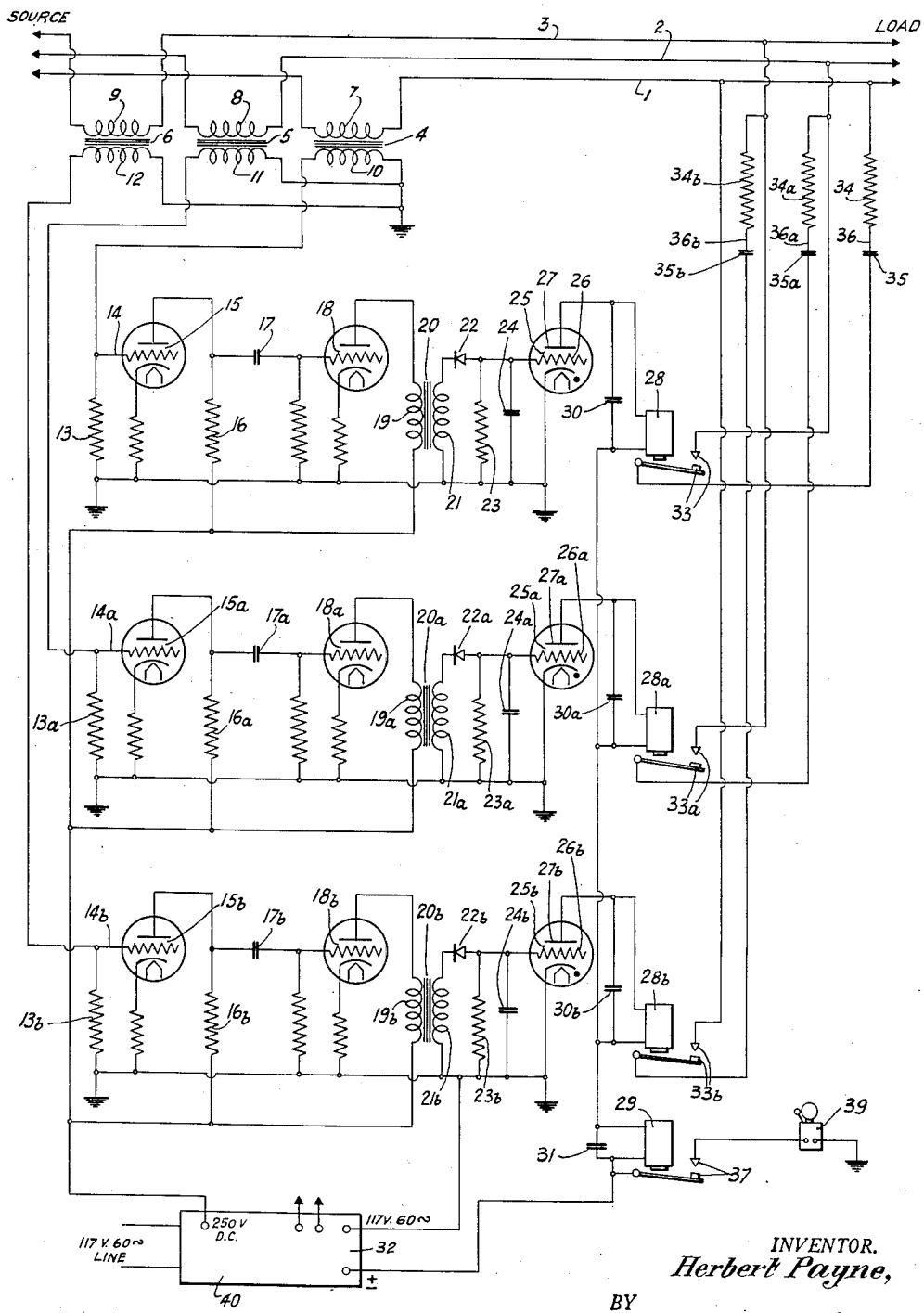

2,459,239

UNITED STATES PATENT OFFICE 2,459,239

FAULT DETECTOR FOR TRANSMISSION LINES

Herbert Payne, New York, N. Y., assignor to Control Instrument Company, Inc., Brooklyn, N. Y., a corporation of New York Application May 22, 1947, Serial No. 749,773

5 Claims. (Cl. 177—311)

This invention relates to improvements in line fault detectors for alternating current transmission lines.

In most applications involving power it is relatively unimportant as to whether or not the detector is a power-consuming device in view of the fact that the load or the transmitter is relatively insensitive to unbalanced currents in the line. However, some applications, particularly those involving the use of self-synchronous motors as transmitting or indicating devices, make it imperative that the lines remain free from any influence which may tend to unbalance them so that the intelligence transmitted through them may retain the required degree of accuracy.

An object of this invention is therefore to provide an improved instrument of relatively high impedance which may be used for detecting line faults in alternating current transmission lines where the system is sensitive to such power consumed as may tend to unbalance the currents carried by the line.

A further object of the invention is to detect only the current conditions and be independent of the voltage conditions of the line so that should the system develop a fault, the inability to carry a current from the source will actuate a signalling device.

These and other features of the invention will become apparent in the course of the following description; it being understood, however, that the specification and drawing which serve to disclose one embodiment of the invention are intended to illustrate rather than define or limit the scope of the invention, reference being made to the appended claims for that purpose.

In the drawing the figure is a diagrammatic representation of a circuit embodying the characteristics of the present invention.

Referring to the drawing, 1, 2 and 3 are lines representing a polyphase power source, or lines interconnecting a self-synchronous generator and control transformer. In series with said lines are the current transformers 4, 5 and 6, so that any current flowing in the line 1 must of necessity flow through the primary 7 of transformer 4, any current flowing in line 2 must flow through the primary 8 of transformer 5, and any current flowing in line 3 must flow through primary 9 of transformer 6.

Since the case for each of the lines is analogous to that of any other, the description that follows will illustrate the sequence of events which occurs for one line only.

Any current flow in line 1 will, by virtue of its flow in the primary 7 of transformer 4, induce voltage in the secondary 10 thereof, which voltage will be proportional in magnitude to the current flow in the primary 7. This voltage will exist across resistor 13, one terminal of which is grounded making it effectively in shunt with the secondary 10 of transformer 4. The ungrounded terminal of resistor 13 is connected to the grid 14 of a vacuum tube amplifier 15, which amplifier tube is shown as a triode. However, any type of voltage amplifier would be suitable regardless of the number of its elements. The voltage across the resistor 13 is connected to the grid 14 of the amplifier tube 15 and its variations will affect the current flow in the plate circuit thereof, and therefore will, by virtue of the load resistor 16 and coupling capacitor 17, appear as a grid voltage to a second amplifier tube 18. Variation of the grid voltage in the vacuum tube 18 causes variation in its plate current, which current flows in the primary 19 of transformer 20 thus appearing in the secondary 21 thereof as an alternating voltage, and at a large increase in power as compared with the voltage across resistor 13.

Power for the vacuum tube amplifiers is furnished from a supply 40 which is not energized by the transmission lines under test.

The rectifier 22, in series with resistor 23, is in shunt with the secondary 21 of transformer 20 thus permitting current to flow only on negative half cycles through the resistor 23, and a voltage equal to the peak of the transformer secondary voltage is stored in condenser 24 which is in shunt with said resistor. The shunt combination of resistor 23 and condenser 24 is in the grid circuit of the grid controlled rectifier 25 and the negative direct current voltage obtained from the output of the rectifier 22 and stored in condenser 23 is applied directly to the grid 26 thereof. The plate 28 of the grid controlled rectifier 25 is connected in series with a pair of direct current relays 28 and 29, by-passed by capacitors 30 and 31, respectively, to a source of alternating current, one side of which is grounded, thus making the plate 27 thereof alternately positive and negative at a rate determined by the supply frequency.

Ordinarily, a rectifier tube will conduct if its plate is positive with respect to its cathode but the grid 26 is negative and, as long as it is maintained negative, no conduction can take place in the tube 25. There is, therefore, no current flow and no reaction on the part of the relays 28 and 29. Since the negative voltage of the grid 26 of the grid controlled rectifier 21 is determined by, and is a function of, a flow of current in line 1 of the transmission line, as long as current flows in line 1, no conduction can take place in the grid controlled rectifier 25. If, however, current in line 1 should fail, there will be no voltage across resistor 13, no amplification in vacuum tubes 15 and 18, no rectification in element 22 and, after an interval of time determined by the magnitude of resistor 23 and capacitor 24 to permit the capacitor 24 to discharge, no negative bias on grid control rectifier 25. The grid will then no longer control the tube, and the tube will fire on alternate positive half cycles and conduct a unidirectional current, which current will flow through the windings of the relays 28 and 29 which are in series with the plate 27 of tube 25.

In shunt with the relays 28 and 29 are the two capacitors 30 and 31 which are chosen to be of such magnitudes that, when the grid controlled rectifier 25 fires and permits a rectified direct current to flow, the condenser 30 will charge very rapidly but the condenser 31 will take at least ten times as long to charge. Thus the relay 28 will be energized almost instantly upon firing of rectifier 25 or as soon as the current in line 1 approaches zero. Action of the relay 28 will cause its contacts 33 to close, completing a circuit through a high impedance element 36, such as the series combination of resistor 34 and capacitor 35, between line 1 and any other line of the system (shown herein as line 2).

A small current will thereupon flow in line 1 and through impedance 36 to line 2. This current, however, must also flow in the primary 7 of transformer 4 and, through the means hereinbefore outlined, will therefore re-establish a negative bias on grid 26 of grid controlled rectifier 25. Upon the succeeding half cycle, when the alternating current makes the plate 27 of tube 25 negative, the grid 26 will thereupon regain control of the tube and prevent its further conduction, thus effectively stopping direct current flow through relays 28 and 29 and permitting the contacts 33 thereof to break the circuit which places the high impedance 36 across lines 1 and 2.

Braking the contacts 33 will cause the high impedance 36 to stop drawing current and the failure of current through transformer 4 will, by the same process, cause tube 25 to fire again and thus close the circuit through the high impedance 36. In other words, relay 28 will open and close its contacts 33 intermittently, at a rate so rapid as not to permit a sufficient current to flow and to thus charge condenser 31 sufficiently to actuate relay 29.

Thus, if there is no line fault, a lack of current will not create an alarm and the magnitude of the impedance 36 introduced as a power-consuming element is so large as to cause negligible unbalance. If, however, there is a line fault and line 1 is either open or short-circuited so that no current from the source can reach transformer 4 directly, a failure of current will cause the voltage across resistor 13 to disappear and the closure of contacts 33 of relay 28 will not restore that current. Since, by its position in the circuit, impedance 36 is close to the load terminus of the line and cannot now draw current except through the load, if any, no current in transformer 4 will be restored by the action of relay 28. The contacts 33 will therefore not break and the grid controlled rectifier 25 will continue to conduct. The rectified current in the plate circuit of 25 will build up to a sufficient value to charge condenser 31 and thus to actuate relay 29 whose contacts 37 close, completing a circuit through an alarm or other signaling device which will indicate the occurrence of the fault.

Similar circuits bearing numerals as above but with lettered subscripts are provided for the other lines of the system, each acting in an identical manner, so that transformers 5 and 6 are connected with transmission lines 2 and 3 in the same manner in which transformer 4 is connected to line 1, etc. The relay 29 is illustrated as utilized to actuate the alarm for all three circuits, but may be replaced by three individual relays and alarm circuits if individual indications are required by the nature of the circuits.

The high impedances 36a and 36b associated with relays 28a and 28b must be connected between the line in which the fault is to be determined and any other line of the system in a manner similar to the element 36. It is also recommended that these connections of the high impedances 36, 36a and 36b be made as close to the load terminal of the line as possible, otherwise the presence of a fault between the impedance and the line terminals will not be indicated. With the impedances 36, 36a and 36b thus placed, a fault anywhere between the source and the load terminals will be detected even though the line under test may be drawing current despite the fault with the load as an apparent source.

What is claimed is:

1. In a fault detecting means for alternating current transmission lines which differentiates between absence of current due to no load and an absence thereof due to a fault, the combination of means associated with said lines and responsive to current flow therein, means including a high impedance coacting with the first named means and activated by an absence of current in said transmission lines to establish a high impedance load and cause a small current to flow, and signaling means coacting with the last named means and operable when said high impedance means fails to cause a current to flow.

2. In a fault detecting means for alternating current transmission lines which differentiates between absence of current due to no load and an absence thereof due to a fault, the combination of means associated with said lines and responsive to current flow therein, means coacting with the first named means and responsive to the absence of current in said lines, relay means activated by the last named means, high impedance means connected to said lines and controlled by said relay means to establish a high impedance circuit across said lines, and signaling means coacting with said relay activating means and operable if said high impedance means fails to draw a small current.

3. In a fault detecting means for alternating current transmission lines which differentiates between absence of current due to no load and an absence thereof due to a fault, the combination of means associated with the said lines responsive to current flow therein, means coacting with the first named means and responsive to the absence of current flow in said lines, relay means activated by the last named means, high impedance means connected with said lines and controlled by said relay means to establish a high impedance circuit across said lines, a second relay means activated by said second named means, and signaling means assocaited with said second relay means and operable if said high impedance means fails to draw a small current.

4. In a fault detecting means for alternating current transmission lines which differentiates between absence of current due to no load and an absence thereof due to a fault, the combination of means associated with the said lines responsive to current flow therein, electronic tube amplifier means coacting with the first named means and responsive to the absence of current flow in said lines, relay means activated by the last named means, high impedance means connected with said lines and controlled by said relay means to establish a high impedance circuit across said lines, and means activated by said electronic tube amplifier means, and coacting with signaling means, operable if said high impedance means fails to draw a small current.

5. In a fault detecting means for alternating current transmission lines which differentiates between absence of current due to no load and an absence thereof due to a fault, the combination of transformer means associated with said lines and responsive to current flow therein in terms of voltage, amplifier means, rectifying means, a second rectifying means coacting with the first named rectifying means and with said amplifier means to make its conduction a function of current flow in said lines, relay means coacting with the second rectifying means and with high impedance means for restoring a small current in said lines, signaling means, and a second relay means coacting with the first named relay means and with said signaling means to operate the same if a small current flow is not established by said high impedance means.

HERBERT PAYNE.

REFERENCES CITED

The following references are of record in the file of this patent:

UNITED STATES PATENTS

| Number | Name | Date |
|---|---|---|
| 1,765,475 | White et al. | June 24, 1930 |
| 2,052,057 | Reid | Aug. 25, 1936 |